United States Patent

Prinzler et al.

Patent Number: 5,810,454
Date of Patent: Sep. 22, 1998

[54] ELECTRICALLY CONTROLLABLE BRAKE SYSTEM

[75] Inventors: Hubertus Prinzler, Langenhagen; Christof Maron, Gehrden; Thomas Dieckmann, Pattensen, all of Germany

[73] Assignee: Continental Aktiegesellschaft, Hanover, Germany

[21] Appl. No.: 660,927

[22] Filed: Jun. 10, 1996

[30] Foreign Application Priority Data

Jun. 10, 1995 [DE] Germany .................. 195 21 175.8

[51] Int. Cl.$^6$ ............................................. B60T 13/66
[52] U.S. Cl. ........................................... 303/20; 188/158
[58] Field of Search .................. 303/20, 3, 9.62, 303/189, 199; 188/156, 158; 364/426.01–426.03

[56] References Cited

U.S. PATENT DOCUMENTS

| | | | |
|---|---|---|---|
| 3,870,378 | 3/1975 | Carp ................................ | 303/20 X |
| 4,602,702 | 7/1986 | Ohta et al. .......................... | 303/20 X |
| 4,658,939 | 4/1987 | Kircher et al. ...................... | 303/20 X |
| 5,125,483 | 6/1992 | Kitigawa et al. .................... | 303/20 X |
| 5,230,549 | 7/1993 | Osada et al. ........................ | 303/20 X |

FOREIGN PATENT DOCUMENTS 4339570   5/1995   Germany .

*Primary Examiner*—Peter M. Poon
*Attorney, Agent, or Firm*—Walter Ottesen

[57] ABSTRACT

The invention is directed to an electrically/electronically controllable braking system including: a brake actuating device 6, at least two brake circuits (2, 4) and two processors (8a, 8b; 10a, 10b) for each brake circuit (2, 4) for driving the actuators (12a to 12d) and for the control of further functions such as slip control functions. The processors (8a, 8b) of the rear brake control are joined in a rear brake control apparatus 16 and the processors (10a, 10b) of the front wheel brake control are joined in a front brake control apparatus 18. The allocations of the functions of the electric control apparatus for both brake circuits are optimized especially while considering reliability. The brake actuating device 6 outputs its actuating function via signal lines 7 to all processors (8a, 8b; 10a, 10b). In order to do with a minimal number of processors, the processors (8a, 8b) of the rear axis circuit 4 assume additional functions (14a, 14b) of the overall vehicle control, such as ABS reference speed formation, driving dynamic control, et cetera. Preferably, the highly-integrated processors (8a, 8b) at the rear axis are operatively connected to each other via line 20 for the purpose of mutual control and switchoff in the event of a fault.

4 Claims, 2 Drawing Sheets

ELECTRICALLY CONTROLLABLE BRAKE SYSTEM

FIELD AND BACKGROUND OF THE INVENTION

The invention relates to an electrically/electronically controllable brake system and especially a brake system of the brake-by-wire type. The brake system has at least two brake circuits as disclosed, for example, in German patent publication 4,339,570.

In brake systems of this kind, the assignment of functions of the electronic control units for the two brake circuits are optimized while especially considering reliability.

SUMMARY OF THE INVENTION

The electrically controllable braking system, such as a brake-by-wire braking system, is for a vehicle having rear wheels defining a rear axis and front wheels defining a front axis. The braking system includes: first and second rear brake actuators for corresponding ones of the rear wheels; first and second front brake actuators for corresponding ones of the front wheels; a first braking circuit for the rear axis and including first and second rear processors for driving the first and second rear brake actuators, respectively; a second braking circuit for the front axis and including first and second front processors for driving the first and second front brake actuators, respectively; a rear control apparatus incorporating the first and second rear processors; a front control apparatus incorporating the first and second front processors; a brake actuating device for generating an electrical signal indicative of a braking command initiated by the operator of the vehicle; signal line means connecting the brake actuating device to the processors to permit the electrical signal to be transmitted to the processors; and, the first and second rear processors being adapted to assume additional functions for overall vehicle control including ABS-reference speed formation and driving dynamic control.

In the overall system, a minimal number of processors is required because of the different functions and therefore the different degrees of integration associated therewith for the individual processors used.

The processors of the rear axis circuit assume additional functions of the overall vehicle control, such as ABS reference speed formation, driving dynamic control, et cetera. For this reason, the degree of integration of the processors on the front axis is less than on the rear axis. Accordingly, the system reliability on the front axis is correspondingly higher than at the rear axis.

All functions are treated redundantly and all processors receive the redundant brake pedal signal in triplicate. Each processor is then in the position to effect a basic braking operation on the basis of the pure brake pedal signals when there is a malfunction of the so-called higher ranking functions which concern the overall vehicle control.

The electronic control units assigned individually to the rear wheels are equipped to perform higher-ranking functions and are coupled to each other. By equipping the control units in this way, the invention proceeds from the fact that, in an electric braking system, it is conventional that one unit is provided for the so-called higher-ranking functions. These higher-ranking functions are those which relate to the overall vehicle, that is, functions which relate to the overall vehicle rather than to a wheel. Up to now, these higher-ranking functions were processed centrally. If these vehicle-related functions would be integrated into the braking control units for all individual wheels, then the complex and expensive processors which are required therefor would be needed four times without, at the same time, increasing operational reliability.

According to the invention, these higher-ranking functions, which take into account the total system of the vehicle, such as the electronic distribution of the braking force and the formation of the reference speed of the motor vehicle, are integrated into the electronic control units of the individual wheels; However, not at all four wheels but only at two wheels, namely, the rear wheels. The suggestion, according to which only the rear wheels are equipped with the units for the higher-ranking functions, proceeds from the following consideration. These higher-ranking functions are significant and decisive for driving safety because the individual wheels can be braked without actuating the pedal and, in this way, the braking sequence of the vehicle is coordinated. The higher-ranking functions are complex functions.

For reasons of safety, these higher-ranking functions cannot be allowed to run nonredundantly. Accordingly, these higher-ranking functions must control each other and are therefore required in duplicate.

In a corresponding manner, the highly integrated processors at the rear axis are operatively connected to each other. In this way, the possibility is afforded that the two processors can control each other for the overall vehicle control with respect to the additional functions and switch off in the case of a malfunction.

The rear axis is especially relevant for driving safety and, according to the invention, a wheel blockage caused by a processor malfunction is precluded; whereas, at the front axis whereat the greatest part of the braking force is developed, a very low rate of malfunction is ensured.

If one would introduce such a mutual left-right control on both axes, then a considerable increase in disablement would result and therefore a lower level of safety. This is so because, when a fault would occur in one unit of a rear axis, the entire block of the rear axis (both control units for the individual wheels) would switch off.

It could be detected whether a fault has occurred; however, because this situation does not pertain to a three-processor structure, it cannot be detected on which rear wheel such a fault has occurred. As a consequence thereof, the entire system switches off which means that the brake actuators at the rear axis become inoperative. Accordingly, a control takes place with a switch-off function.

The switch-off command also includes the basic functions. For this reason, and according to the invention, the execution of the left-right control is limited to the rear axis because at the rear axis, only approximately 30% of the braking force is developed. Thus, if a fault occurs in the higher-ranking functions, the remaining portion of the basic function for braking is the 70% of the braking force available at the front axis. If a mutual control would also take place at the front axis, then the system would no longer be in the position to satisfy the requirements as to overall reliability.

Since the higher-ranking functions are integrated into the electronic control units of the individual wheels, separate processors for these higher-ranking functions are not needed.

Accordingly, no mutual control is provided at the front axis. For this reason, and in the case of a fault, the two brake actuators of the forward axis are not switched off and therefore the braking action at the important front axis is not completely lost in the case of a fault.

In the worst case, it is conceivable that a front wheel brake actuator either becomes inoperable or completely blocks the front wheel. Such a wheel blocking is significantly less critical at the front axis than at the rear axis. At the rear axis, a wheel blockage can lead to swerving. A greater system reliability in the rate of fault is reached by omitting the alternating control at the front axis. An individual fault can, however, be more severe because of the omitted mutual control, but the probability that both brakes become inoperative at the front axis is very remote. In the worst case, a front wheel brake does not participate in the braking action.

The data of the brake actuating device are conducted individually to each control unit via a CAN-BUS, which connects the control units of the individual wheels to each other. If the data which is derived from the higher-ranking functions is transmitted forwardly, (that is, when the higher-ranking functions desire a specific division of braking force), this can be transmitted forward via the CAN-BUS. If this CAN-BUS is interrupted (physically cut), then all processors can continue to operate in the basic functions because all receive the brake pedal data directly.

In the event that statutory requirements do not permit coupling along an axis to realize two circuits, then the electronically controllable braking system of the invention can, in the same manner, be realized also as a diagonal two circuit system.

In total, a minimization of electronic complexity and the costs associated therewith is provided together with a high system reliability with the braking system according to the invention.

The braking system is applicable to all wheel-supported transport means.

BRIEF DESCRIPTION OF THE DRAWINGS

The invention will now be described with respect to the drawings wherein.

DESCRIPTION OF THE PREFERRED
EMBODIMENTS OF THE INVENTION

Figure 1:
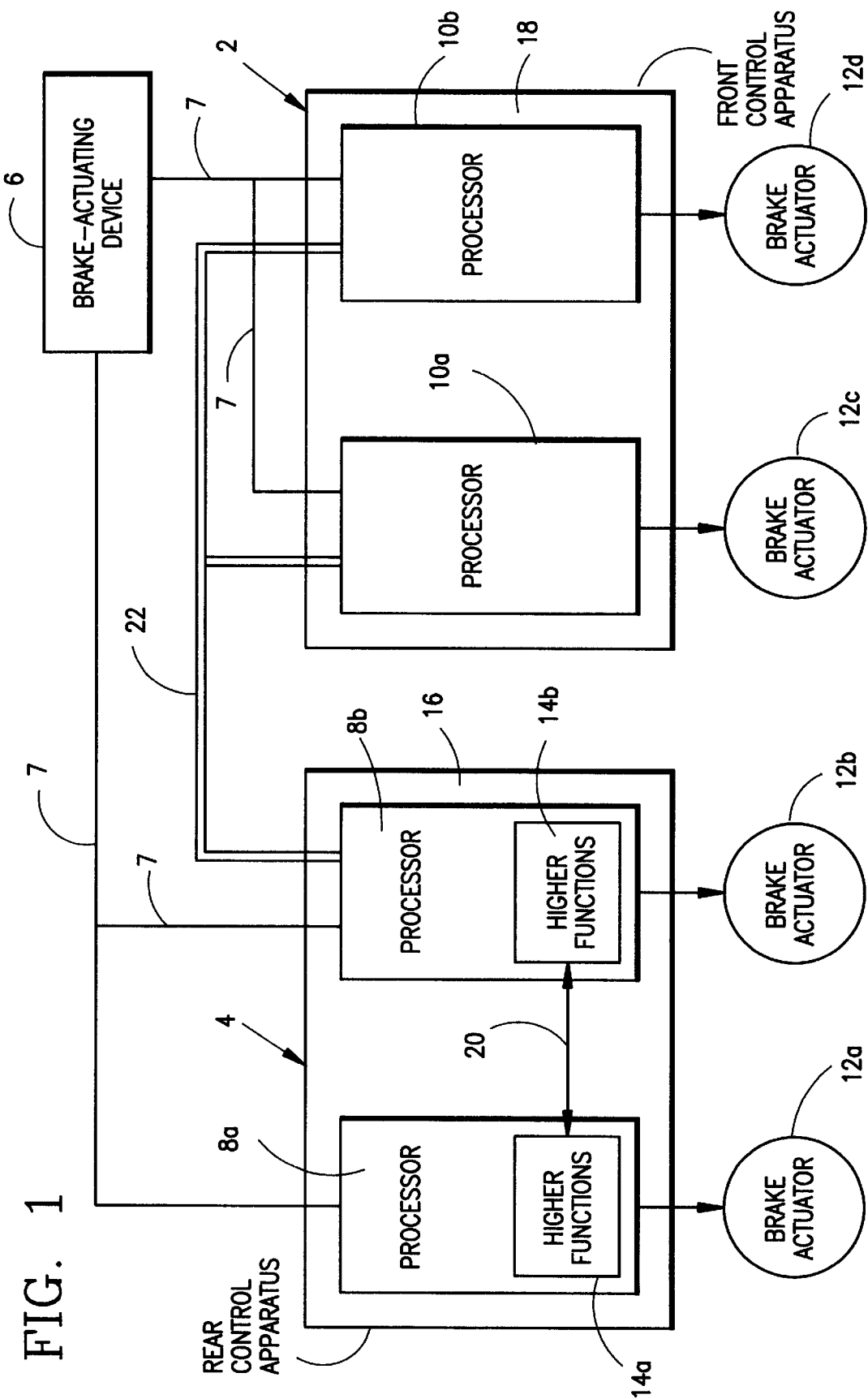
FIG. 1 is a schematic of the electrically controllable brake system of the invention wherein the two brake systems of a first embodiment of the invention are arranged along respective ones of the front and rear axes of the vehicle; and, FIG. 2 is a schematic of two brake systems arranged diagonally between the front and rear axes of the vehicle according to a second embodiment of the invention.

The block circuit diagram of FIG. 1 shows an electrically/electronically controllable two circuit brake system having the two brake circuits (2, 4) and a brake-actuating device 6. The brake actuating device 6 is, for example, a brake pedal of the vehicle and includes a transducer for converting the mechanical displacement of the brake pedal into an electrical braking signal. In this system, the two rear wheel brakes and the two front wheel brakes are combined to form respective brake circuits (2, 4). The two processors (8a, 8b) define a common rear control apparatus 16 and the two processors (10a, 10b) define a common front control apparatus 18. The individual processor units (8a, 8b, 10a, 10b) control the actuators (12a to 12d), respectively, and assume further functions individual to the respective wheels, such as local slip control functions which are assigned thereto.

The actuators (12a to 12d) are electric motors which, for example, apply brake pads to corresponding brake discs.

The processors (8a, 8b) of the rear axis circuit 4 assume, in addition, so-called higher functions (14a, 14b) of the overall vehicle control, such as ABS reference speed formation, driving dynamic control, et cetera. These higher functions (14a, 14b) concern the overall vehicle control and are operatively connected to each other for the purpose of mutual control via line 20. Furthermore, a CAN-BUS 22 connects the processor units (8b, 10a, 10b) to each other which are provided for each wheel individually. It is not necessary that the CAN-BUS also be connected to processor 8a because the line 20 connects processor 8a to processor 8b.

The brake actuating device 6 outputs its actuating function via signal line 7 to all processors (8a, 8b; 10a, 10b).

Figure 2:
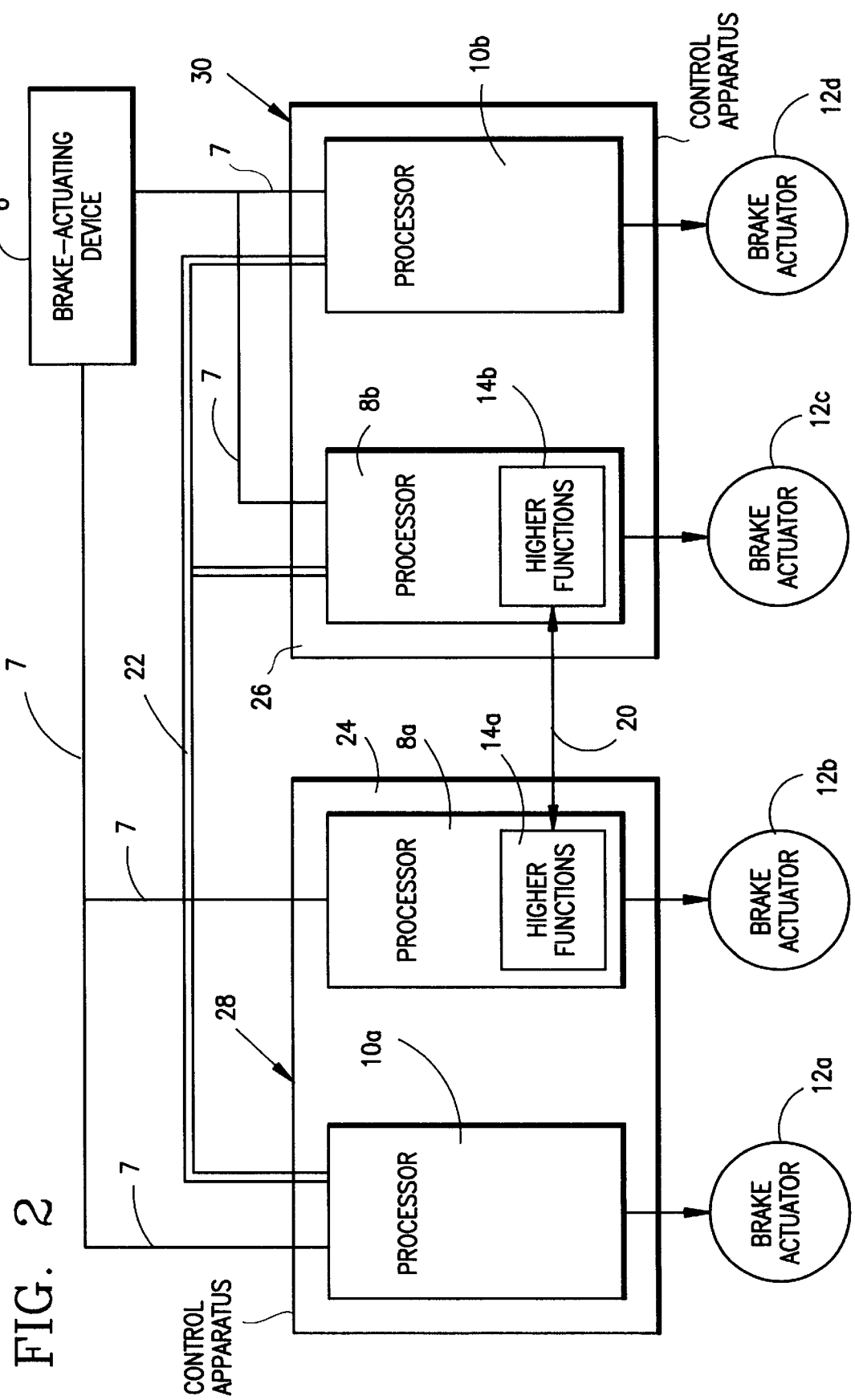

The block diagram of FIG. 2 shows a diagonal sectioning of the two brake circuits. Here, a first diagonal brake circuit 28 includes a rear wheel brake processor 8a and an opposite lying front wheel brake processor 10a and a second diagonal brake circuit 30 includes rear wheel brake processor 8b and an opposite lying front wheel brake processor 10b.

The processors (8a, 8b, 10a, 10b) receive their brake actuating functions from the brake-actuating device 6 via the signal line 7.

The "higher functions" 14a and 14b are arranged in respective control apparatuses (24, 26) of the respective diagonal brake circuits (28, 30) and are integrated into the processors (8a, 8b) of the rear axis brake control. The "higher functions" (14a, 14b) communicate with each other via the data connection 20 for the purposes of mutual control.

As in the embodiment of FIG. 1, here too a CAN-BUS 22 connects the processors (8a, 8b, 10a, 10b), which are individual to each wheel, to each other.

It is understood that the foregoing description is that of the preferred embodiments of the invention and that various changes and modifications may be made thereto without departing from the spirit and scope of the invention as defined in the appended claims.

What is claimed is:

1. An electrically controllable braking system including a brake-by-wire braking system for a vehicle having rear wheels defining a rear axis and front wheels defining a front axis, the braking system comprising:

first and second rear brake actuators for corresponding ones of said rear wheels;

first and second front brake actuators for corresponding ones of said front wheels;

a first braking circuit for said rear axis and including first and second rear processors for driving said first and second rear brake actuators, respectively;

a second braking circuit for said front axis and including first and second front processors for driving said first and second front brake actuators, respectively;

a rear control apparatus incorporating said first and second rear processors;

a front control apparatus incorporating said first and second front processors;

a brake actuating device for generating an electrical signal indicative of a braking command initiated by the operator of the vehicle;

signal line means connecting said brake actuating device to said processors to permit said electrical signal to be transmitted to said processors; and, said first and second rear processors being adapted to assume additional functions for overall vehicle control including ABS-reference speed formation and driving dynamic control.

2. The electrically controllable braking system of claim 1, further comprising means for interconnecting said two rear processors to permit said rear processors to control each other and to facilitate a switchoff thereof in the event of a fault.

3. The electrically controllable braking system of claim 1, further comprising a CAN-BUS for connecting said rear control apparatus to said first and second front processors.

4. An electrically controllable braking system including a brake-by-wire braking system for a vehicle having rear wheels defining a rear axis and front wheels defining a front axis, the braking system comprising:

first and second rear brake actuators for corresponding ones of said rear wheels;

first and second front brake actuators for corresponding ones of said front wheels;

a first braking circuit including a first rear processor for driving said first rear brake actuator and a first front processor for driving said first front brake actuator;

a second braking circuit arranged diagonally relative to said first braking circuit and including a second rear processor for driving said second rear brake actuators and a second front processor for driving said second front brake actuator;

a first control apparatus incorporating said first rear processor and said first front processor;

a second control apparatus incorporating said second rear processor and said second front processor;

a brake actuating device for generating an electrical signal indicative of a braking command initiated by the operator of the vehicle;

signal line means connecting said brake actuating device to said processors to permit said electrical signal to be transmitted to said processors; and, said first rear processor and said second rear processor being adapted to assume additional functions for overall vehicle control including ABS-reference speed formation and driving dynamic control;

a CAN-BUS for connecting said processors to each other; and, means for interconnecting said first rear processor and said second rear processor to control each other and to facilitate a switchoff thereof in the event of a fault.

* * * * *